United States Patent [19]
Oyama et al.

[11] Patent Number: 4,967,861
[45] Date of Patent: Nov. 6, 1990

[54] CENTRAL DIFFERENTIAL FOR A FOUR-WHEEL DRIVE MOTOR VEHICLE

[75] Inventors: Fusami Oyama; Takeo Inoue, both of Shinjuku, Japan

[73] Assignee: Fuji Jukogyo Kabushiki Kaisha, Tokyo, Japan

[21] Appl. No.: 263,636

[22] Filed: Oct. 27, 1988

[30] Foreign Application Priority Data

Nov. 4, 1987 [JP] Japan ................ 62-279533

[51] Int. Cl.⁵ ............................ B60K 17/34
[52] U.S. Cl. .................... 180/233; 180/248; 475/198; 475/230; 475/330
[58] Field of Search ......... 180/233, 248, 249; 74/695, 700, 7013301031; 475/230, 198, 330

[56] References Cited

U.S. PATENT DOCUMENTS

| Re. 17,039 | 7/1928 | Burkhardt | 74/695 |
| 4,651,587 | 3/1987 | Anderson et al. | 74/713 X |
| 4,754,661 | 7/1988 | Barnett | 74/713 X |
| 4,779,699 | 10/1988 | Hatano | 180/248 |

FOREIGN PATENT DOCUMENTS

| 55-72420 | 5/1980 | Japan . | |
| 61-123250 | 8/1986 | Japan . | |
| 283618 | 10/1952 | Switzerland | 74/695 |
| 1283460 | 1/1987 | U.S.S.R. | 74/695 |

Primary Examiner—Mitchell J. Hill
Attorney, Agent, or Firm—Martin A. Farber

[57] ABSTRACT

A central differential for a four-wheel drive motor vehicle is provided on a pair of axles for right and left drive wheels. The differential has a cylindrical differential case connected to a final gear of a transmission, a pair of carriers provided in the differential case one of which is connected to the drive wheels and the other carrier is operatively connected to the other drive wheels. A pair of annular side gears are securely provided in the differential case, and an annular center gear rotatably mounted in the differential case between the side gears. A pair of planetary gears are rotatably supported in the corresponding carrier. Each planetary gear comprises a pair of planet pinions, one of which is engaged with the side gear and the other is engaged with the center gear.

3 Claims, 2 Drawing Sheets

CENTRAL DIFFERENTIAL FOR A FOUR-WHEEL DRIVE MOTOR VEHICLE

BACKGROUND OF THE INVENTION

The present invention relates to a central differential provided in a power transmission system for a four-wheel drive motor vehicle.

Japanese patent application Laid-Open 55-72420 discloses a central differential which comprises a differential case, encasing two differential pinion gears and two bevel side gears meshed with pinion gears, and internally splined to drive wheel axles, and a ring gear attached to the case and engaged with a drive pinion.

In order to restrain the differential operation, two sets of clutch plates operated by oil pressure are provided for locking the drive wheel axles to the case on a slippery road. Pressure oil is applied to clutches through a hydraulic circuit having a solenoid operated valve. Accordingly, the structure of such a central differential is complicated. Further, the central differential is locked, after a control system detects slipping of wheels of the vehicle in accordance with the speed difference of front and rear drive wheels in excess of a predetermined value. Thus, the locking operation is inevitably ineffective.

Japanese Utility Model Application Laid-Open 61-123250 discloses a differential comprising a worm gear and a worm wheel for permitting the differential operation when a motor vehicle makes a turn. When the vehicle travels on the straight road, the differential is locked because of the irreversible function of the worm gear. This differential may be employed for a central differential.

However, in such a structure, since the worm gear device has a large sliding resistance the transmission efficiency reduces and wearing of the gears increases. Further, since the worm gear is used, the structure of the differential is complicated so that manufacturing cost increases.

SUMMARY OF THE INVENTION

The object of the present invention is to provide a system which is simple in structure and compact in size.

The other objects and features of this invention will become understood from the following description with reference to the accompanying drawings.

DETAILED DESCRIPTION OF THE PREFERRED EMBODIMENT

Figure 1:
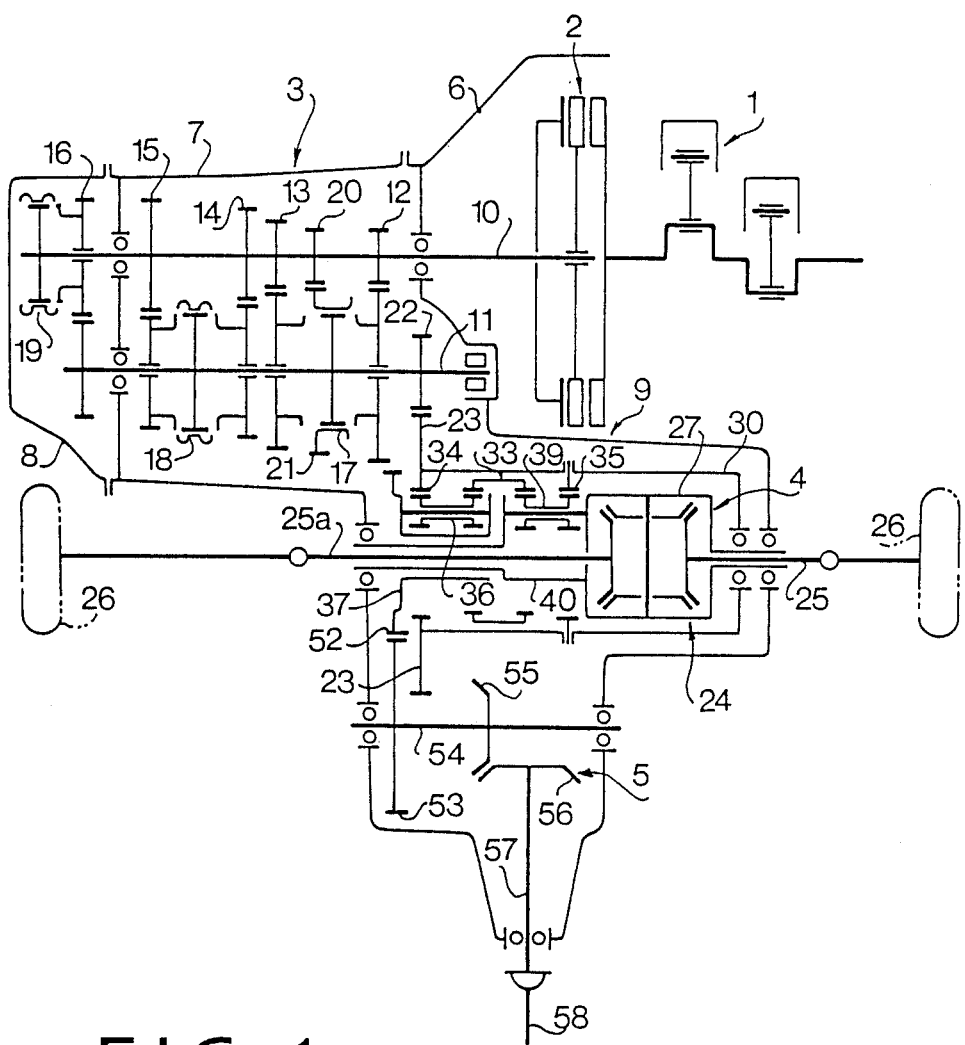
FIG. 1 is a schematic diagram of a four-wheel drive power transmission system of the present invention.

FIG. 1 shows a power transmission system for a four-wheel drive motor vehicle to which the present invention is applied. An engine 1 is laterally mounted on the motor vehicle at a front portion thereof. The power transmission system comprises a clutch 2 housed in a clutch housing 6, transmission 3 and transfer device 5, the latter two housed in a transmission case 7 and an extension case 8. The transmission 3 has an input shaft 10, an output shaft 11 parallel with the input shaft 10, five pairs of change-speed gear 12 to 16 corresponding to first to fifth (overdrive) speed gears, and synchronizers 17 to 19. The synchronizers 17 to 19 are disposed between the gears 12 and 13, between 14 and 15 and adjacent the gears 16, respectively. A reverse drive gear 20 mounted on the input shaft 10 meshes with a gear 21 formed on one side of a sleeve of the synchronizer 17 through an idler gear (not shown) for reverse drive.

A drive gear 22 fixedly mounted on the output shaft 11 meshes with a final gear 23 integral with a differential cover 30 of a differential device of the transfer device 5. The transfer device 5 has a central differential 9 and a front differential 4. The central differential 9 (a first differential) is composed of planetary gear devices and disposed between the final gear 23 and a differential device 24 of the front differential 4 (a second differential). The front differential 4 is connected to axles 25 and 25a so as to transmit the power to front wheels 26 of the vehicle.

Figure 2:
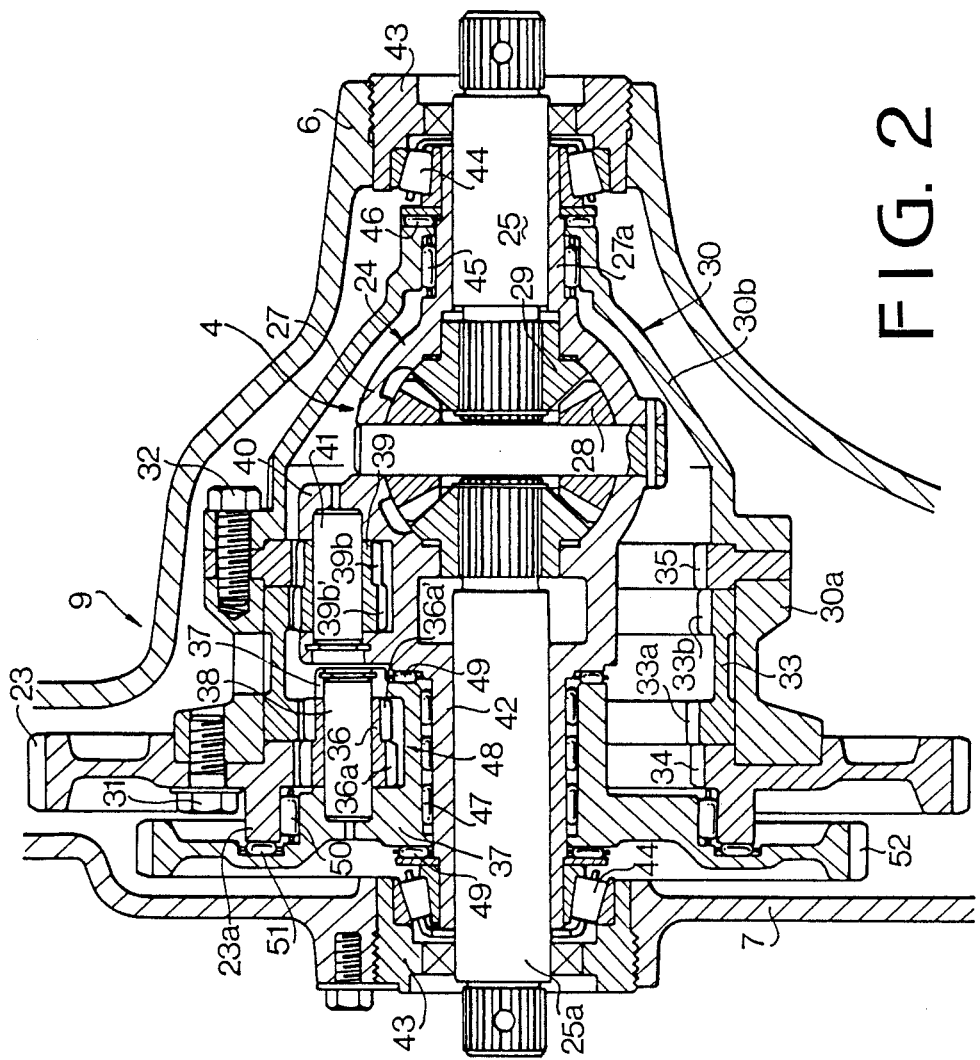
FIG. 2 is a sectional view of a differential system of the present invention.

Referring to FIG. 2, the central differential 9 is housed in the differential cover 30. The differential cover 30 comprises a cylindrical body 30a and a conical body 30b secured to the cylindrical body 30a by bolts 32 at their flanges. The final gear 23 is secured to the cylindrical body 30a by bolts 31.

In the cover 30, an annular center gear 33 is rotatably mounted on an inner wall of the body 30a. The center gear 33 has a pair of internal gears 33a and 33b, which are different from each other in number of teeth. Adjacent the gear 33a, an internal gear 34 formed on an inner periphery of the final gear 23 is provided as a side gear. Adjacent the gear 33b, an annular side gear 35 is disposed between the cylindrical body 30a and the conical body 30b and secured thereto by bolts 32. The number of teeth of the side gear 34 is different from the number of teeth of the side gear 35.

A carrier hub 42 integral with a differential case 27 of the front differential 4 is rotatably mounted on the drive axle 25a. A hub 27a of the differential case 27 is rotatably mounted on the drive axle 25. The differential case 27 supports two differential pinion gears 28 and two bevel side gears 29 meshed with pinion gears 28 and internally splined to front drive wheel axles 25 and 25a, respectively. Carrier hub 42 and hub 27a are rotatably mounted on bearings 44, 44 provided in bearing cases 43. The end of the conical body 30b is mounted on the hub 27a through a radial bearing 45 and a thrust bearing 46.

A carrier hub 48 is mounted rotatably mounted on the axle 25a by being mounted on the carrier hub 42 through a needle bearing 47 and mounted in an annular boss 23a formed on the final gear 23 through a radial bearing 50 and a thrust bearing 51. Both ends of the carrier hub 48 are held by thrust bearings 49. The carrier hub 48 has a radially extending portion on which a rear drive wheel output gear 52 is externally formed. A first carrier 40 and a second carrier 37 are provided. A shaft 38 is secured to the carrier 37 formed on the hub 48. A shaft 41 is secured to the carrier 40 integral with the carrier hub 42. A double planet gear 36 is rotatably mounted on the shaft 38. The planet gear 36 has an outer planet pinion 36a meshed with the side gear 34 and an inner planet pinion 36a' meshed with the gear 33a of the center gear 33. The planet pinions 36a and 36a' are different from each other in number of teeth. Three planet gears 36 carried by the carrier 37 are circumferentially disposed on the carrier hub 42 at equidistant positions.

Similarly, a double planet gear 39 is rotatably mounted on the shaft 41. The planet gear 39 has planet pinions 39b and 39b ' which are engaged with the side gear 35 and the gear 33b of the center gear 33, respectively. The pinions 39b, 39b ' are also different in number of teeth.

Referring to FIG. 1, the output gear 52 engages with a driven gear 53 securely mounted on a transfer shaft 54 of the transfer device 5. The transfer shaft 54 is connected to a rear drive shaft 57 perpendicular to the transfer shaft 54 through a pair of bevel gears 55, 56, thereby transmitting the power to rear wheels of the vehicle by way of a propeller shaft 58.

For differential operation, the structure of the gear train of the central differential 9 of the present invention has a relation as follows. When a vehicle goes around the corner, the front and rear driving wheels with respect to the corner move in opposite directions by the same amount.

When the carriers 37 and 40 are rotated one revolution, gear speeds $n_a$ and $n_b$ of the internal gears 33a and 33b of the center gear 33 are represented as follows.

$$n_a = 1 - (S_1 \cdot P_1 / C_1 \cdot P_1)$$

$$n_b = 1 - (S_2 \cdot P_2 / C_2 \cdot P_2)$$

where $S_1$ is the number of teeth of side gear 34, $C_1$ is the number of teeth of gear 33a of center gear 33, $P_1$ and $P'_1$ are numbers of the teeth of planet pinions 36a and 36a' of planet gear 36, $S_2$ is the number of teeth of side gear 35, $C_2$ is the number of teeth of gear 33b of center gear 33, and $P_2$ and $P'_2$ are numbers of the teeth of planet pinions 39b and 39b' of planet gear 39.

Thus, when the difference between both the equations becomes zero, namely the gear speed $n_a$ equals to the gear speed $n_b$ in the same direction, the differential operation is achieved. In that case, if the speed of the wheels rotated in the opposite direction is represented by the negative quantity, the above equations are expressed as follows.

$$(-n_a) - (+n_b) = 0$$

$$(S_1 P'_1 / C_1 \cdot P_1) + (S_2 \cdot P'_2 / C_2 \cdot P_2) = 2$$

Thus, the number of teeth of each gear is determined to satisfy the above equation.

On the other hand, when the vehicle drives on a straightaway, the gear train is operated to restrict rotations of the gears.

Describing the operation, the power of the engine 1 is transmitted to the transmission 3 through the clutch 2 and the input shaft 10. By operating synchronizers 17, 18 and 19, the power of the engine is transmitted to the final gear 23 through the transmission 3. The transmitted power is further transmitted to the differential cover 30, so that the side gears 34 and 35 rotate to try to rotate planet gears 36 and 9.

In straightaway driving, each of the planet gears 36 and 9 is subjected to the rotational force of differential cover 0 through the side gears 34 and 35. However, the speeds of both planet gears which are applied to the center gear 33 are different from each other because of the different gear ratios. Accordingly, the center gear 33 cannot be rotated. Thus, the gear train is in undifferentiating state so that the gears are integrated with the differential cover 30, and the carriers 37 and 40 to equally transmit the power to the front drive wheels 26 through the differential device 24 and drive axles 25 and 25a.

At the same time, the power is transmitted to the rear drive wheels (not shown) through the output gear 52, gears 53, 55, 56 and shafts 54, 57, 58.

When the vehicle turns around a corner, carriers 37 and 40 of the central differential 9 are rotated in the opposite directions, relatively in accordance with the difference between the speeds of the front and rear wheels. The carriers 37 and 40 rotate the planet gears 36 and 39 to rotate gears 33a and 33b of the center gear 33 at the same speeds in accordance with the gear ratios. Thus, the difference between the speeds of the front and rear wheels is absorbed. In this state, the carrier 40 rotates to transmit the power to the differential device 24, where the difference between the speeds of the inner and outer drive wheels is absorbed.

The carrier 37 rotates in the opposite direction to the carrier 40 at the same amount as the carrier 40 to transmit the power to the rear drive wheels, relatively. Accordingly, the vehicle smoothly turns the corner with the central differential function.

On the other hand, if either of the front or rear wheels float or are on a slippery surface of the road, the load for the wheels reduces. Accordingly, one of the planet gears 36 or 39 corresponding to the wheels attempts to rotate. However, since the pitch circles of the planet gears are slightly different from each other, the rotary force dependent on the difference is cancelled by sliding friction on the shaft of the planet gears Thus, the torque to the wheels which are going to spin is transmitted to the other wheels, thereby preventing the wheels from spinning.

In accordance with the present invention, the central differential comprises a planetary gear device having the following functions: a differential operation; and an operation restraining the differential operation. Thus the structure is simplified without the differential restraining locking device. Since the worm gear device is not employed, friction in the device is reduced at cornering, thereby reducing fuel consumption.

Since the gears for the central differential are coaxially disposed with each other at a position between the final gear and the differential device, the construction is simplified and the lubrication oil for the gears may be sufficiently supplied.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A differential system for a four-wheel drive motor vehicle having a first differential for differentiating front and rear wheels of a vehicle, a second differential housed in a differential case and operatively connected to a pair of axles for differentiating right and left wheels of a set of drive wheels of the motor vehicle, and a final gear transmitting power from a transmission, the first differential comprising:

a differential cover rotatably supported and secured to the final gear;
   a first carrier disposed in the differential cover and secured to said differential case of the second differential;

a second carrier disposed in the differential cover and operatively connected to another set of drive wheels of the motor vehicle;

a pair of annular side gears integral with the differential cover;

a center gear having a pair of gears and rotatably mounted in the differential cover;

a first planet gear having a pair of planet pinions and rotatably supported on the second carrier;

a second planet gear having a pair of planet pinions and rotatably supported on the second carrier;

one of the planet pinions of the first planet gear engaged with one of the side gears and the other one of the planet pinions of the first planet gear engaged with one of the gears of the center gear;

one of the planet pinions of the second planet gear engaged with the other of the side gears and the other one of the planet pinions of the second planet gear engaged with the other of the gears of the center gear; and the planet pinions of each planet gear define pitch circles which are slightly different.

2. The first differential according to claim 1, wherein $$(S1 \cdot P'1/C1 \cdot P1) + (S2 \cdot P'2/C2 \cdot P2)$$

is substantially equal to 2, wherein numbers of teeth of the side gears are S1 and S2, numbers of teeth of the gears of the center gear are C1 and C2, numbers of teeth of the planet pinions of the second planet gear are P1 and P'1, and numbers of teeth of the planet pinions of the first planet gear and P2 and P'2.

3. A central differential for a four-wheel drive motor vehicle having a transmission, the transmission transmitting power to a final gear, comprising:

a differential cover rotatably supported and secured to the final gear;

a pair of axles rotatably supported and extending into the differential cover;

first and second carriers disposed in the differential cover and rotatably supported on at least one of the axles;

a differential disposed in the first carrier between the axles so as to perform differentiating operation for right and left wheels of a set of drive wheels of the motor vehicle, said right and left wheels being operatively connected to the axles, respectively;

a pair of annular side gears integral with the differential cover;

a center gear having a pair of gears and rotatably mounted in the differential cover;

a pair of planet gears, each of said pair of planet gears comprising a pair of planet pinions and each of said pair of planet gears rotatably supported on a different one of the carriers, respectively;

one of the planet pinions of each planet gear being engaged with a different one of the side gears, respectively, and the other one of the planet pinions of each planet gear being engaged with a different one of the gears of the center gear, respectively;

the second carrier being operatively connected to another set of drive wheels of the motor vehicle so as to transmit output of the second carrier to said another set of drive wheels, and $(S1 \cdot P'1/C1 \cdot P1) + (S2 \cdot P'2/C2 \cdot P2)$ is substantially equal to 2, wherein numbers of teeth of the side gears are S1 and S2, numbers of teeth of the gears of the center gear are C1 and C2, numbers of teeth of the planet pinions of the second planet gear are P1 and P'1, and numbers of teeth of the planet pinions of the first planet gear are P2 and P'2.

* * * * *